(12) United States Patent
Hunker

(10) Patent No.: US 6,224,137 B1
(45) Date of Patent: May 1, 2001

(54) AUXILIARY SUN SHIELD FOR A FRONT WINDSHIELD VISOR

(76) Inventor: Richard E. Hunker, 509 N. Main St., Scottsburg, IN (US) 47170

( * ) Notice: Subject to any disclaimer, the term of this patent is extended or adjusted under 35 U.S.C. 154(b) by 0 days.

(21) Appl. No.: 09/626,258

(22) Filed: Jul. 26, 2000

(51) Int. Cl.[7] .................................................. B60J 3/00
(52) U.S. Cl. .................. 296/97.6; 296/97.2; 248/229.16; 24/562
(58) Field of Search ................. 296/97.6, 97.2; 248/229.16, 231.81, 223.26, 316.7; 24/562, 556, 557, 555, 569, 486

(56) References Cited

U.S. PATENT DOCUMENTS

| | | | |
|---|---|---|---|
| 2,020,585 | * 11/1935 | Stansberry | 296/97.6 |
| 2,458,125 | * 1/1949 | Winkler | 296/97.2 |
| 2,528,038 | * 10/1950 | Crise | 296/97.6 |
| 2,829,919 | * 4/1958 | Bartlett | 296/97.6 |
| 3,158,396 | * 11/1964 | Berger | 296/97.6 |
| 3,304,118 | * 2/1967 | Jonas | 296/97.6 |
| 3,415,569 | * 12/1968 | Leevo | 296/97.6 |
| 3,522,968 | * 8/1970 | Honor | 296/97.6 |
| 3,545,805 | 12/1970 | Wilson . | |
| 3,837,703 | * 9/1974 | Holladay | 296/97.6 |
| 3,954,297 | 5/1976 | Linke et al. . | |
| 4,023,854 | * 5/1977 | Nack | 296/97.6 |
| 4,167,287 | 9/1979 | Franklin et al. . | |
| 4,317,589 | 3/1982 | Kuss . | |
| 4,635,995 | 1/1987 | Mineck . | |
| 4,845,809 | * 7/1989 | Pillifant | 296/97.6 |
| 4,889,380 | * 12/1989 | Pillifant | 296/97.6 |
| 4,982,992 | * 1/1991 | Vu et al. | 296/97.6 |
| 5,611,591 | 3/1997 | Van Devender . | |
| 5,626,381 | * 5/1997 | Gervasoni et al. | 296/97.6 |
| 5,673,957 | 10/1997 | Moo et al. . | |
| 5,678,880 | * 10/1997 | Keller | 296/97.6 |
| 6,012,758 | 1/2000 | Fisher . | |

* cited by examiner

Primary Examiner—D. Glenn Dayoan
Assistant Examiner—Kiran B. Patel
(74) Attorney, Agent, or Firm—Charles R. Wilson

(57) ABSTRACT

An auxiliary sun shield for use on a motor vehicle's windshield visor effectively blocks out sun rays which the visor itself is not capable of blocking. The auxiliary sun shield comprises a clip member and a glare reducing polymeric sheet element rotatably mounted on the clip member. The clip member has two elongated legs joined at lower terminuses by a connecting leg. The connecting leg has two opposed side wall recesses. The glare reducing polymeric sheet element is generally rectangular-shaped with a notch in an approximately centered upper edge. The notch is shaped to have two inwardly extending opposed ears. The notch and the opposed ears are dimensioned to fit over the connecting leg of the clip member and extend into the recesses of the connecting leg. The auxiliary sun shield can be moved laterally on the windshield visor as needed by moving the clip member and the glare reducing polymeric sheet element can be radially rotated on the clip member to an angle as needed depending on the driver's seat height and sun's position in the sky.

16 Claims, 5 Drawing Sheets

AUXILIARY SUN SHIELD FOR A FRONT WINDSHIELD VISOR

FIELD OF THE INVENTION

This invention relates to an auxiliary sun shield. More particularly, it relates to an adjustable auxiliary sun shield for semi-permanent mounting on a front windshield visor of a motor vehicle.

BACKGROUND OF THE INVENTION

All drivers of motor vehicles can attest to the fact that there are certain times during a day when the vehicle's direction of travel and the sun's position in the sky create a near blinding driving situation. Even at night time, an on-coming vehicle with its bright lights on can cause a blinding effect. All vehicles are equipped with windshield visors for the front windshield. Each visor is simply flipped down from a rest position adjacent the vehicle's roof liner to a position which about parallels the windshield and is near the windshield's top edge. The standard sized visor is dimensioned to leave a substantial amount of front windshield area available for viewing purposes. Most sun problems are readily handled with the vehicle's standard windshield visors.

Certain travel and sun position conditions occur which create a sun glare problem which the standard windshield visors of the motor vehicle are not able to fully eliminate. A larger sized visor would meet the need, though would also interfere with the driver's view of the road. Having to stop at a traffic light and then having to watch the stop light for it to change can be difficult too at times. The standard opaque windshield visor is of no value in these situations. The sun glare problem is very prevalent, experienced by all drivers at least occasionally and by some drivers on an almost daily basis. Numerous attempts have been made to produce a product which attaches to the windshield visor to solve what has proved to be a longstanding problem. U.S. Pat. Nos. 3,304,118, 3,545,805, 3,954,297, 4,167,287, 4,317,589, 4,635,995, 5,611,591, 5,673,957, 5,678,880, and 6,012,758 contain disclosures of several product attempts. There are only a few characteristics which a successful auxiliary sun shield product must possess. It must be universally adaptable for use on all or at least most all motor vehicle models. The product must be easily accessed by the driver and readily adjusted to the particular condition. The product also must be inexpensive. To date, no product intended for use in blocking out sun glare in the motor vehicle has been developed which truly has all the aforementioned characteristics.

In accord with a long felt and widely recognized need, there has now been developed an auxiliary sun shield for use in a motor vehicle. The auxiliary sun shield is conducive to mass production with low manufacturing costs. The auxiliary sun shield is readily positioned on the motor vehicle's windshield visor. It is also readily adjusted to a use position as needed. The auxiliary sun shield of the invention is adaptable for installation on most vehicle models and is beneficial to drivers of all normal heights.

SUMMARY OF THE INVENTION

An auxiliary sun shield comprises a clip member and a glare reducing polymeric sheet element rotatably mounted on the clip member. The clip member is for mounting on the auto vehicle's windshield visor in a manner where it can move laterally depending on the need. The clip member has two elongated legs, each having an upper terminus and a lower terminus. The legs are joined together at their lower terminuses by a connecting leg to form a generally U-shaped configuration. The elongated legs have a gripper means on an inside face of the upper terminuses for gripping the windshield visor. Side walls of the connecting leg have a recess. The glare reducing polymeric sheet element has a notch in an approximately centered upper edge and further the notch is shaped to have opposed ears. The opposed ears are configured to fit into the recesses of the connecting leg of the clip member. When needed, the glare reducing polymeric sheet element is capable of being radially rotated about the connecting leg of the clip member until the sheet element reaches a position where sun glare is blocked.

DETAILED DESCRIPTION OF THE INVENTION

The auxiliary sun shield of the invention is intended for use in motor vehicles of all types, including automobiles, vans, pick-up trucks, and transport trucks. The auxiliary sun shield is mounted at least on the motor vehicle's driver-side windshield visor, though can be also mounted on the motor vehicle's passenger-side windshield visor as well.

Figure 1:
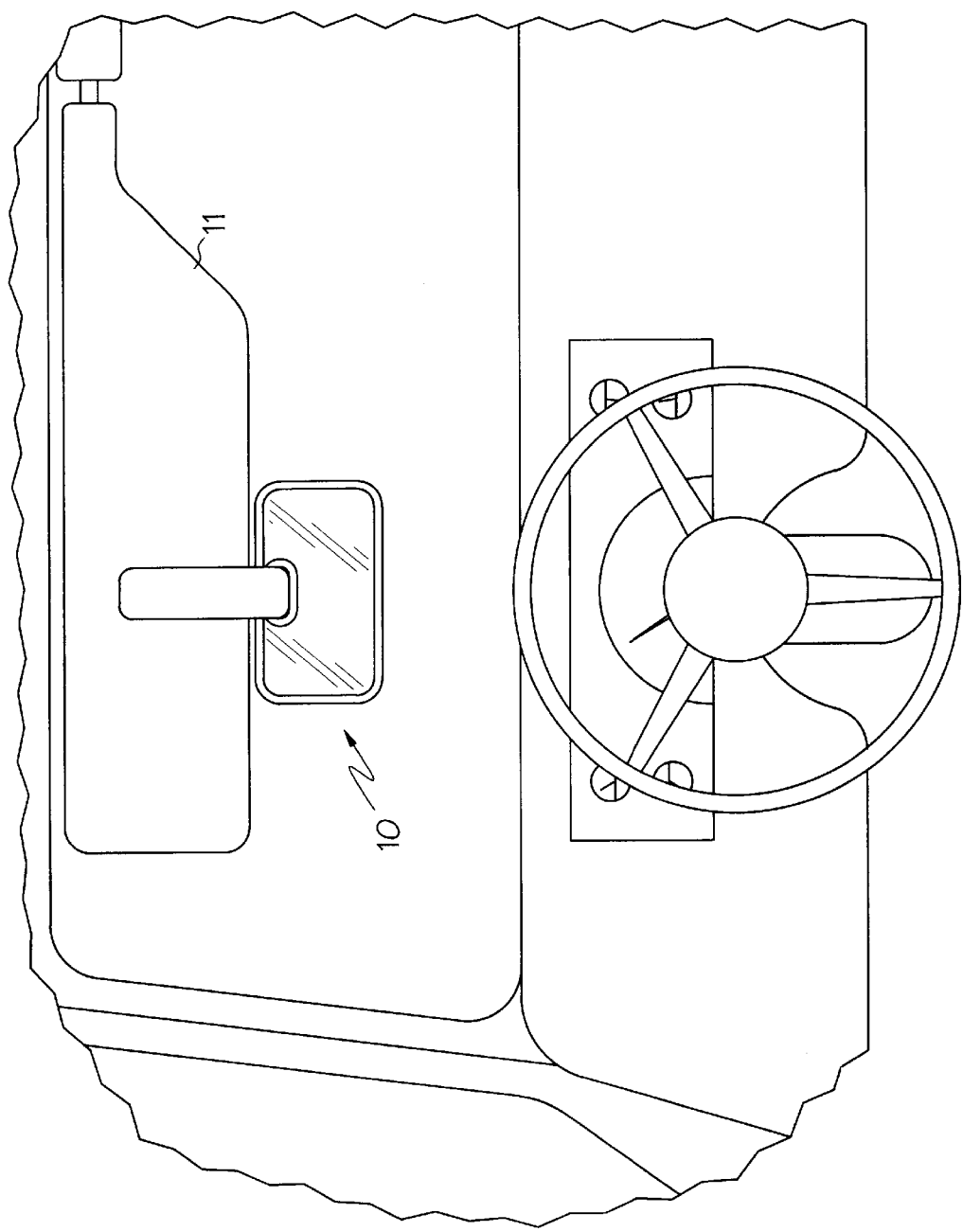
FIG. 1 is an environmental view showing the auxiliary sun shield of the invention mounted on the windshield visor of a motor vehicle.
Figure 2:
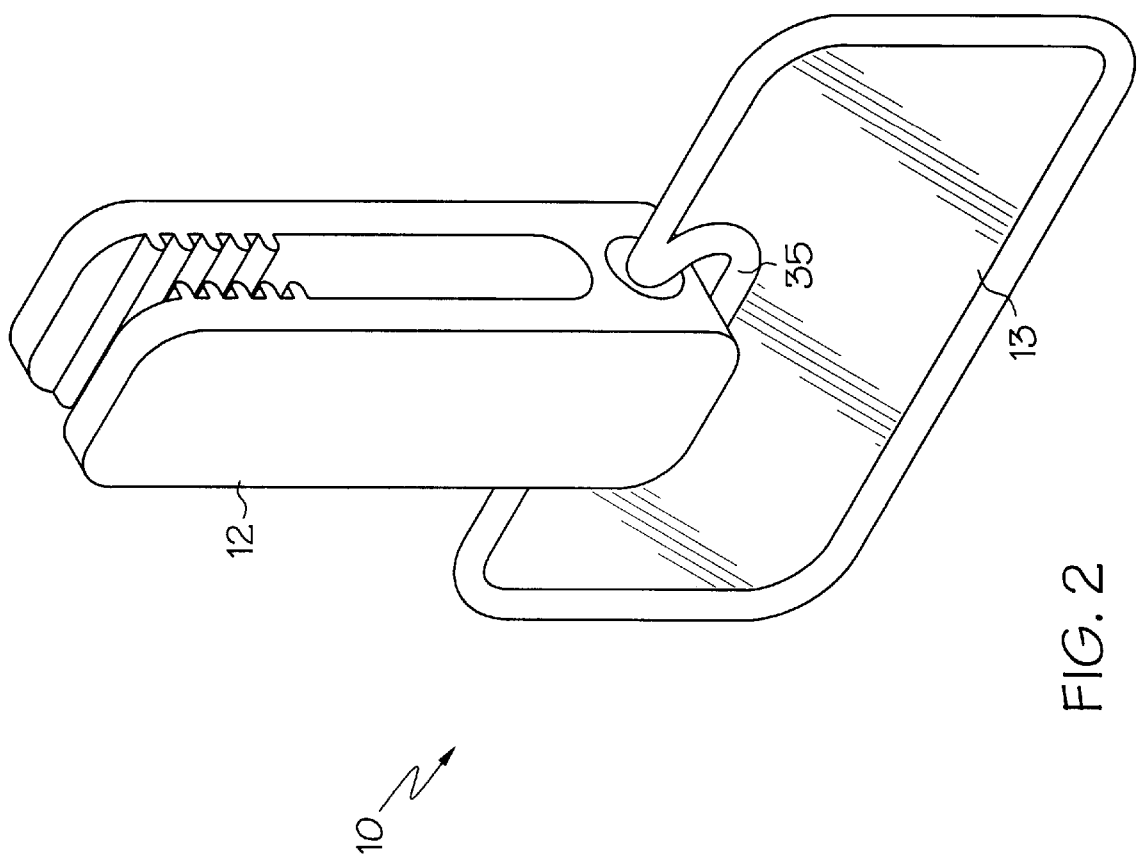
FIG. 2 is a perspective view of the auxiliary sun shield of FIG. 1.

With reference to FIG. 1, the auxiliary sun shield 10 of the invention is mounted on a driver's windshield visor 11 of a motor vehicle. As best seen in FIG. 2, the auxiliary sun shield 10 comprises a clip member 12 and a glare reducing polymeric sheet element 13. Each of the components of the auxiliary sun shield is described in detail in the following paragraphs and with particular references to the drawings. A manner of use of the auxiliary sun shield is also described.

Figure 5:
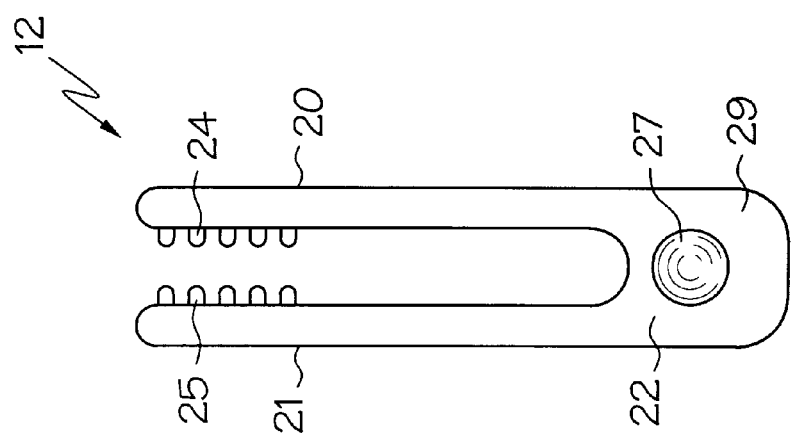
FIG. 5 is another side elevational view of an opposed side of the clip member of FIG. 4.
Figure 3:
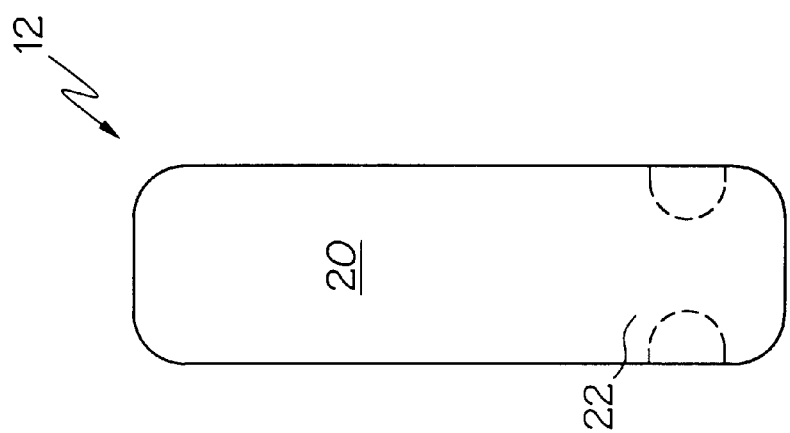
FIG. 3 is a front elevational view of a clip member of the auxiliary sun shield of FIG. 2.
Figure 4:
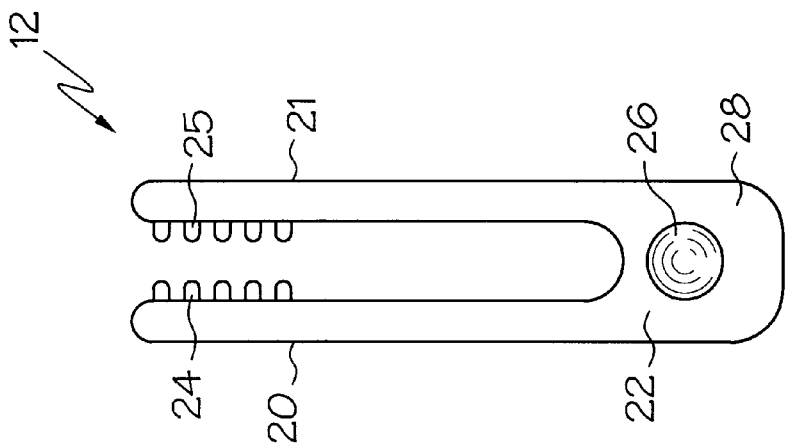
FIG. 4 is a side elevational view of the clip member of FIG. 2.

The clip member 12 of the auxiliary sun shield 10 is best seen in FIGS. 3–5. The clip member 12 is for semi-permanently mounting to the motor vehicle's windshield visor and for holding the glare reducing polymeric sheet element 13 in a manner which allows position adjustability to block out sun rays. Two elongated legs 20 and 21 are joined at their lower terminuses by a connecting leg 22. The resultant clip member has a generally U-shape configuration when viewed from the side as seen in FIGS. 4 and 5. As should be apparent, the clip member's configuration allows a free end of the clip member to be forced onto the motor vehicle's windshield visor, normally until the top of the connecting leg contacts a lower edge of the visor. Each elongated leg 20 and 21, as measured from a point where a lower terminus meets the top of the connecting leg to an extremity of an upper terminus ranges from about two inches to about four inches.

The upper terminus of at least one elongated leg has a gripper means to aid in holding the clip member to the windshield visor. As evident in FIGS. 4 and 5, the gripper means is a set of substantially horizontally extending ridges 24 and 25 on an inside face of the upper terminus of each leg. The ridges 24 and 25 extend substantially across the elongated legs 20 and 21, respectively, and are opposed one another. One set of ridges grabs a front surface of the windshield visor and the opposed second set of ridges grabs the back surface of the windshield visor.

Figure 8:
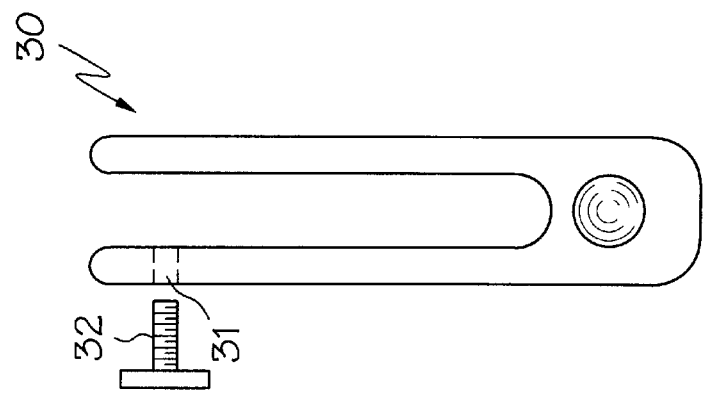
FIG. 8 is a side elevational view of an alternative clip member.

Other gripper means can be used to aid in holding the clip member to the windshield visor. For example and with reference to FIG. 8, at least one elongated leg of the clip member 30 has a threaded hole 31 in an upper terminus and a screw-type fastener 32 for positioning in the threaded hole to adjustly contact the windshield visor. Still other gripper means conventionally used to secure a snug fit to an object can be used.

Again with reference to FIGS. 3–5, the elongated legs of the clip member 12 are capable of being flexed outwardly to initially position the clip member onto the windshield visor and then, upon release of a spreading force, resume their natural position. There is sufficient resiliency in the clip member to accommodate different thicknesses of windshield visors and to accommodate a mirror or other object oftentimes built into a windshield visor by the vehicle's manufacturer. A friction fit onto the vehicle's windshield visor as aided by the horizontally extending ridges acts to semi-permanently hold the clip member in place. The holding power of the clip member is adequate to withstand normal bumps and vibrations encountered on the road.

The connecting leg 22 holds the elongated legs 20 and 21 at a spaced relationship approximately equal to or slightly less than the thickness of the vehicle's windshield visor, i.e. from about 0.25 inches to about 0.50 inches. The connecting leg also has opposed recesses 26 and 27 in each side wall 28 and 29, respectively. The recesses 26 and 27 are approximately centered on the side walls of the connecting leg and are to hold the glare reducing polymeric sheet element 13 as further discussed below. Each recess is about 0.10 inches to about 0.30 inches in diameter and is tapered inwardly to about 0.10 inches to about 0.20 inches in depth to create a dimple-shaped depression.

The clip member 12 is preferably made of a polymeric material in an injection molding operation for cost reasons. It can also be made of other materials such as a metal and made by other production techniques such as machining.

Figure 7:
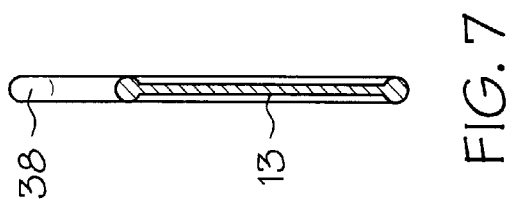
FIG. 7 is a sectional view of the glare reducing polymeric sheet element of FIG. 6 taken along line 7—7 thereof.
Figure 6:
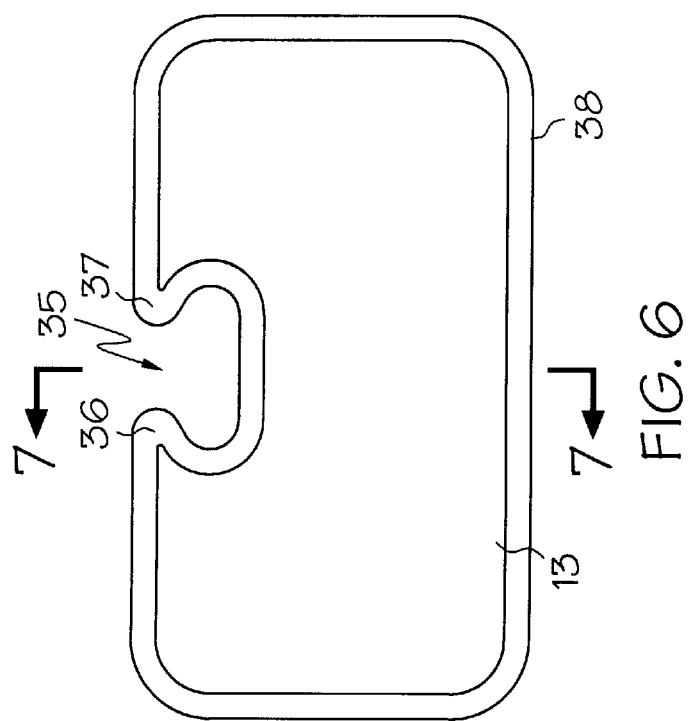
FIG. 6 is a front elevational view of a glare reducing polymeric sheet element of the auxiliary sun shield of FIG. 2.

With reference to FIGS. 6 and 7, the glare reducing polymeric sheet element 13 is flat with a generally rectangular shape and further has a thin cross section. The sheet element can have other geometric shapes which are conducive to creating a substantial sun glare blocking function. Preferably, the glare reducing polymeric sheet element 13 ranges from about three inches to about eight inches in width and about one and one-half inches to about four inches in height. More preferably, the sheet element 13 ranges from about three inches to about four inches in width and about two inches to about three inches in height. Its thickness is not critical, though for manufacturing ease, economy of raw material cost, and flexibility for installation purposes, it has a thickness of less than about 0.30 inches, preferably from about 0.10 inches to about 0.20 inches.

As best seen in FIGS. 2 and 6, the glare reducing polymeric sheet element 13 has a centrally disposed notch 35 in an upper horizontal edge area for attachment purposes to the clip member 12. The notch 35 is shaped to fit around the lower portion of the connecting leg 22 of the clip member 12 and includes a set of opposed inwardly extending ears 36 and 37 to fit into the recesses 26 and 27, respectively of the connecting leg 22. The notch is generally oval-shaped with a narrowed open top. The width of the notch in its widest cross dimension is greater than the width of the clip member 12, i.e. at least at 0.75 inches and preferably about 0.80 to about 1.0 inches. The notch extends down into the sheet element about 0.40 inches to about 0.60 inches from the upper edge of the sheet element. The narrowed open top as measured by the distance between the opposed inwardly extending ears is about the same distance as the distance between the depths of the opposed recesses found in the connecting leg 22 of the clip member 12, i.e. about 0.40 inches to about 0.60 inches. The narrowed open top opening creates the inwardly extending opposed ears 36 and 37. As evident in FIG. 6, the opposed ears of the notch are each rounded and dimensioned to fit into the connecting leg dimple-shaped opposed recesses 26 and 27. As apparent in FIG. 2, when the glare reducing polymeric sheet element is properly positioned on the clip member, each of the ears frictionally fit into the connecting leg recesses, yet allow a rotational movement of the sheet element 13 about the clip member.

The sheet element 13 is detachably mounted on the clip member 12, though normally remains on the clip member at all times. When not needed, it can simply be rotated about the connecting leg of the clip member until it is flat against the vehicle's windshield visor. When needed to block out sun glare, the sheet element is rotated about the connecting leg until a sheet element angle is reached which blocks out the sun glare, yet permits maximum road view. The opposed ears of the notch in the sheet element frictionally engage walls of the connecting leg opposed recesses such that the sheet element angle is retained once reached.

The glare reducing polymeric sheet element 13 is preferably translucent to allow the vehicle's driver to see through the sheet element for safe driving purposes, though it could be opaque as well. The polymeric sheet element 13 can be made by injection molding a polycarbonate resin to obtain the sheet element or by die cutting the sheet element from sheet goods. The resin used to make the sheet element of the sheet is preferably made glare reducing by tinting with a colorant having any desired color shade such that sun glare is significantly reduced, but objects are still visible through the sheet element.

It is highly preferred for rigidity purposes that the glare reducing polymeric sheet element have a rib 38 extending fully around its perimeter. The rib can be molded into the sheet element. It can as well be a separate element adhered to a flat sheet.

Figure 11:
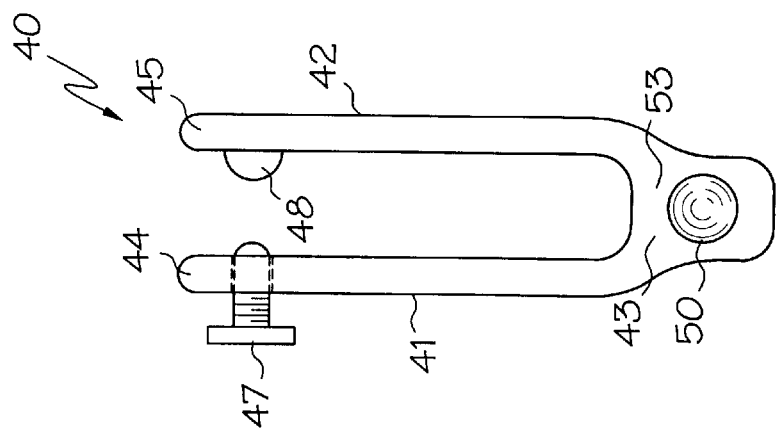
FIG. 11 is another side elevational view of an opposed side of the clip member of FIG. 10.
Figure 9:
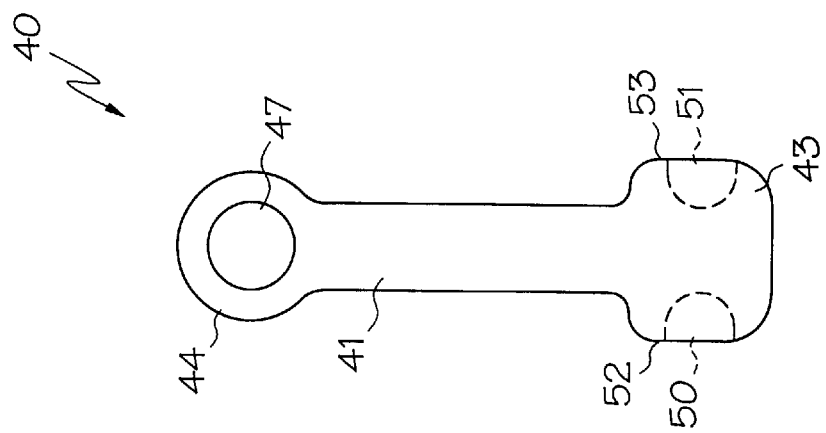
FIG. 9 is a front view of a stream-lined clip member.
Figure 10:
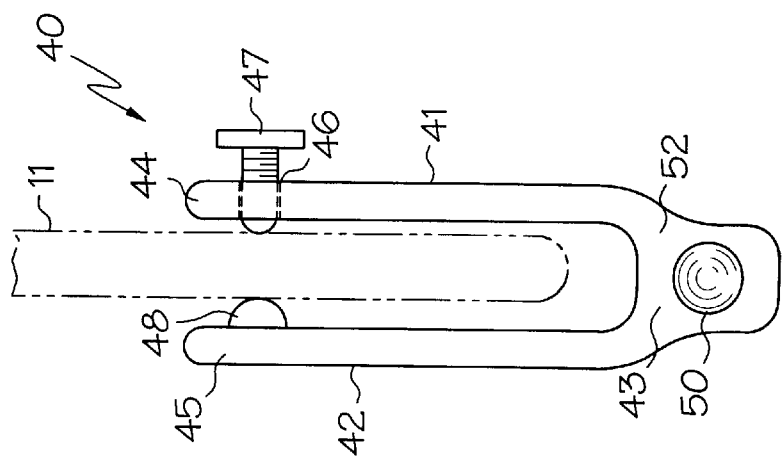
FIG. 10 is a side elevational view of the clip member of FIG. 9.

FIGS. 9–11 illustrate an alternative stream-lined clip member 40. Its use is similar to that of the clip member 30 depicted in FIG. 8. The clip member 40 has two narrow elongated legs 41 and 42 which are joined by a connecting leg 43 to form a U-shaped structure. An upper terminus of each elongated leg is flared out to form a circular-shaped front head 44 and a circular-shaped back head 45. The front head 44 has a threaded hole 46 extending fully through a center area and is used to receive a tightening screw 47. The back head 45 has a knob 48 aligned with the threaded hole 46 in the front head 44. The tightening screw 47 and the knob 48 cooperatively hold the clip member 40 to the vehicle's windshield visor 11 as evident in FIG. 10.

The clip member 40 also has opposed recesses 50 and 51 in side walls 52 and 53 of the connecting leg 43. The opposed recesses are dimple-shaped and are used to receive the opposed inwardly extending ears 36 and 37 of the polymeric sheet element 13. The clip member 40 is preferred because of its stream-lined appearance and lesser manufacturing cost due to its reduced raw material usage.

In use, the clip member is forced onto the windshield visor of the vehicle. The glare reducing polymeric sheet element is then flexed sufficiently to slip the ears of the notch into the recesses of the clip member's connecting leg. The driver can now slide the clip member laterally left or right until the glare reducing polymeric sheet element is in position to block out unwanted sun rays, most noticeably in the early morning and late afternoon hours. A final adjustment is made by rotating the glare reducing polymeric sheet element radially about the connecting leg until the sun rays are fully blocked out and maximum road viewing is retained. Because only one clip member is needed with the sun shield, the driver can adjust the clip member's position and the glare reducing polymeric sheet's position with one hand while the other hand is on the motor vehicle's steering wheel.

Proper use of the motor vehicle's windshield visor and the auxiliary sun shield of the invention significantly prevents problems associated with sun glare such as eye fatigue, eye discomfort and vision impairment. Bright light glare from another vehicle is also alleviated by use of the auxiliary sun shield. Normal operation of the vehicle's visor is not affected. The windshield visor can be approximately positioned and the auxiliary sun shield precisely positioned to accomplish its function. When no longer needed because of a change of travel direction or sun position, the glare reducing polymeric sheet element is rotated upwardly until it is flat with the vehicle's windshield visor.

Having described the invention in its preferred embodiment, it should be clear that modifications can be made without departing from the spirit of the invention. It is not intended that the words used to describe the invention nor the drawings illustrating the same be limiting on the invention. It is intended that the invention only be limited by the scope of the appended claims.

I claim:

1. An auxiliary sun shield for use on a front windshield visor of a motor vehicle wherein the front windshield visor only partially blocks out sun rays shining through a front windshield of the motor vehicle with unblocked sun rays shining into the eyes of an occupant in the motor vehicle's front seat, said auxiliary sun shield comprising:
   (a) a clip member for adjustably mounting on the front windshield visor of the motor vehicle, said clip member having two elongated legs and a connecting leg wherein the elongated legs are joined at lower terminuses to the connecting leg and further wherein at least one of the two elongated legs has an upper terminus with a gripper means for gripping the front windshield visor and further the connecting leg has opposed first and second side walls with a recess on the first side wall and an opposed recess on the second side wall; and
   (b) a glare reducing polymeric sheet element adjustably positioned on the connecting leg of the clip member, said glare reducing polymeric sheet element having a centrally disposed notch in an upper horizontal edge area, said notch shaped with opposed inwardly extending ears for fitting over the connecting leg of the clip member and into the opposed recesses of the clip member and further the distance between depths of the opposed recesses of the clip member and the distance between the opposed inwardly extending ears are substantially the same for radially rotating said glare reducing polymeric sheet element on the clip member to a desired angle whereby unwanted sun rays are blocked out by the glare reducing polymeric sheet element by laterally positioning the clip member on the front windshield visor and by rotationally positioning the glare reducing polymeric sheet element on the clip member.

2. The auxiliary sun shield of claim 1 wherein the two elongated legs of the clip member each has an upper terminus with an inside face and further wherein the gripper means is a set of ridges extending substantially horizontally across each inside face of the elongated legs.

3. The auxiliary sun shield of claim 1 wherein one elongated leg of the clip member has a threaded hole extending through an upper terminus thereof and further the gripper means is a screw-type fastener adjustably positioned in the threaded hole for contacting the motor vehicle's windshield visor during use.

4. The auxiliary sun shield of claim 1 wherein the two elongated legs of the clip member are spaced from about 0.25 inches to about 0.50 inches apart for vertically adjustable positioning on the motor vehicle's windshield visor.

5. The auxiliary sun shield of claim 4 wherein each of the two elongated legs of the clip member ranges from about two inches to about four inches in length.

6. The auxiliary sun shield of claim 5 wherein the glare reducing polymeric sheet element is generally rectangular-shaped with a width of from about three inches to about eight inches and a height of from about one and one-half inches to about four inches.

7. The auxiliary sun shield of claim 6 further wherein the glare reducing polymeric sheet element is tinted with a colorant.

8. The auxiliary sun shield of claim 6 wherein the notch in the glare reducing polymeric sheet element has a width of at least about 0.75 inches and a depth of from about 0.40 inches to about 0.60 inches.

9. The auxiliary sun shield of claim 1 wherein the distance between the depths of the opposed recesses of the clip member and the distance between the opposed inwardly extending ears of the notch of the glare reducing polymeric sheet element each range from about 0.40 inches to about 0.60 inches.

10. An auxiliary sun shield for use on a front windshield visor of a motor vehicle wherein the front windshield visor only partially blocks out sun rays shining through a front windshield of the motor vehicle with unblocked sun rays shining into the eyes of an occupant in the motor vehicle's front seat at varying eye contact angles depending on the position of the occupant's eyes and the position of the sun, said auxiliary sun shield comprising:
   (a) a U-shaped clip member for adjustably mounting on the front windshield visor of the motor vehicle, said clip member having two elongated legs and a connecting leg wherein the elongated legs are joined at lower terminuses to the connecting leg and further wherein at least one of the two elongated legs has an upper terminus with a gripper means for gripping the front windshield visor and further the connecting leg has opposed recesses on side walls thereof; and (b) a generally rectangular-shaped glare reducing polymeric sheet element adjustably positioned on the connecting leg of the clip member, said glare reducing polymeric sheet element having a centrally disposed notch in an upper horizontal edge area, said notch being shaped to fit over the connecting leg of the clip member and further having opposed inwardly extending ears for positioning in the opposed recesses of the clip member to radially rotate on the clip member to a desired angle whereby unwanted sun rays are blocked out by the glare reducing polymeric sheet element by laterally positioning the clip member on the front windshield visor and by rotationally positioning the glare reducing polymeric sheet element on the clip member.

11. The auxiliary sun shield of claim 10 wherein the two elongated legs of the clip member each has an upper terminus with an inside face and further wherein the gripper means is a set of ridges extending substantially horizontally across each inside face of the elongated legs.

12. The auxiliary sun shield of claim 10 wherein one elongated leg of the clip member has a threaded hole extending through an upper terminus thereof and further the gripper means is a screw-type fastener adjustably positioned in the threaded hole for contacting the motor vehicle's windshield visor during use.

13. The auxiliary sun shield of claim 10 wherein the glare reducing polymeric sheet element has a width of from about three inches to about eight inches and a height of from about one and one-half inches to about four inches.

14. The auxiliary sun shield of claim 13 further wherein the glare reducing polymeric sheet element is tinted with a colorant.

15. The auxiliary sun shield of claim 10 wherein the distance between the depths of the opposed recesses of the clip member and the distance between the opposed inwardly extending ears of the notch of the glare reducing polymeric sheet element are substantially the same.

16. The auxiliary sun shield of claim 15 wherein the distance between the depths of the opposed recesses of the clip member and the distance between the opposed inwardly extending ears of the notch of the glare reducing polymeric sheet element each range from about 0.40 inches to about 0.60 inches.

* * * * *